(12) United States Patent
Davis

(10) Patent No.: US 7,278,645 B1
(45) Date of Patent: *Oct. 9, 2007

(54) VERSATILE CARRIER

(76) Inventor: Sam B. Davis, 947 Graves-Delozier Rd., Seymour, TN (US) 37865

( * ) Notice: Subject to any disclaimer, the term of this patent is extended or adjusted under 35 U.S.C. 154(b) by 0 days.

This patent is subject to a terminal disclaimer.

(21) Appl. No.: 11/518,564

(22) Filed: Sep. 11, 2006

Related U.S. Application Data

(63) Continuation of application No. 10/957,890, filed on Oct. 4, 2004, now Pat. No. 7,104,555.

(51) Int. Cl.
*B62B 1/16* (2006.01)

(52) U.S. Cl. .................... 280/47.28; 280/79.3

(58) Field of Classification Search ........ 280/47.28, 280/47.27, 47.29, 47.17, 47.24, 79.3, 79.11
See application file for complete search history.

(56) References Cited

U.S. PATENT DOCUMENTS

| | | | |
|---|---|---|---|
| 2,598,168 A | 5/1952 | Hooz et al. | |
| 2,893,749 A | 7/1959 | Simonsen | |
| 2,964,328 A | 12/1960 | Muir | |
| 3,276,550 A | 10/1966 | Honeyman | |
| 4,521,030 A | 6/1985 | Vance | |
| D296,025 S | 5/1988 | Huether | |
| 4,867,438 A | 9/1989 | Steckert et al. | |
| D311,622 S | 10/1990 | Swig | |
| 5,379,885 A | 1/1995 | Chen | |
| 5,419,569 A | 5/1995 | Walla | |
| 5,509,671 A | 4/1996 | Campbell | |
| 5,810,373 A | 9/1998 | Miranda | |
| 5,893,572 A | 4/1999 | Parks | |
| 6,135,466 A | 10/2000 | Irwin | |
| 6,237,925 B1 | 5/2001 | Koenig | |
| 6,971,654 B2 | 12/2005 | Amsili | |
| 7,104,555 B1 * | 9/2006 | Davis | 280/47.28 |

* cited by examiner

*Primary Examiner*—Hau Phan
(74) *Attorney, Agent, or Firm*—Donald R. Schoonover

(57) ABSTRACT

A carrier includes a supporting unit that is amenable to supporting a wide variety of items. The carrier includes shelves and/or baskets as well as a unit that can be used to support large and/or bulky items. The carrier further includes a stabilizer unit as well as a brake unit. Various attachments can also be mounted on the carrier.

1 Claim, 4 Drawing Sheets

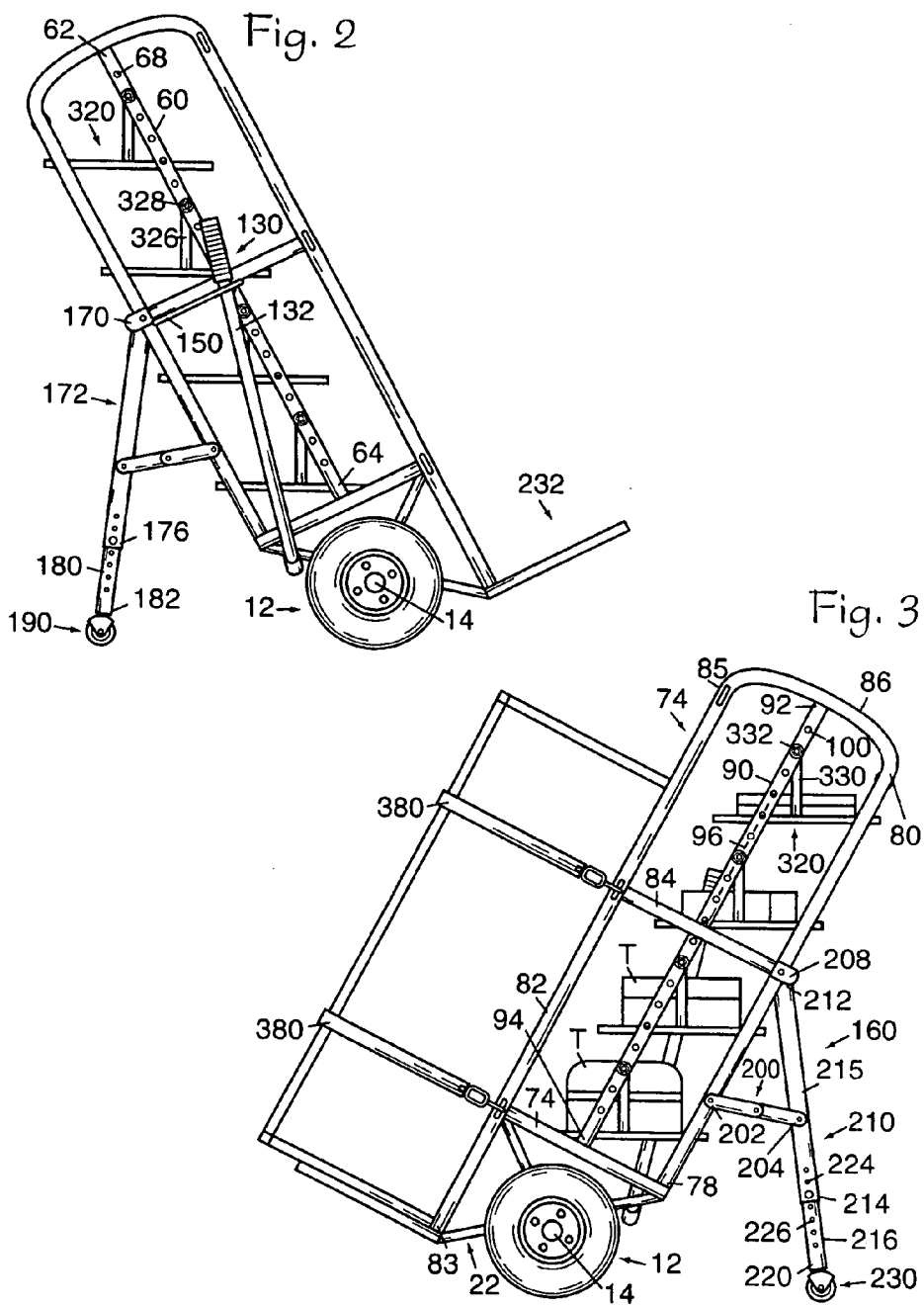

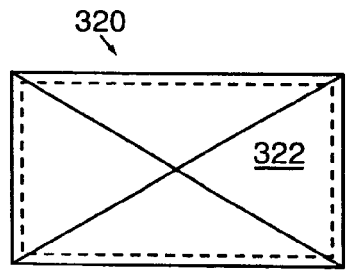
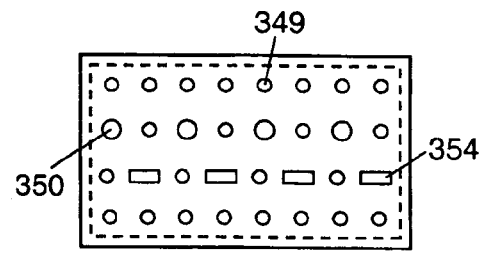
Fig. 4A    Fig. 4B
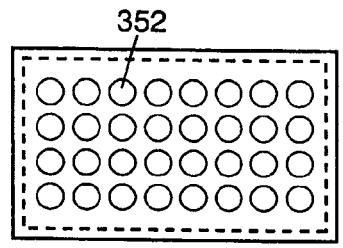
Fig. 4C
Fig. 5
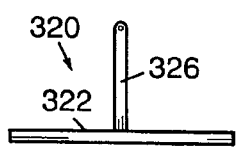
Fig. 6
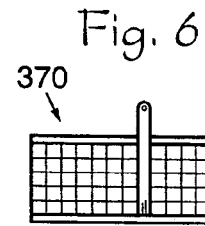
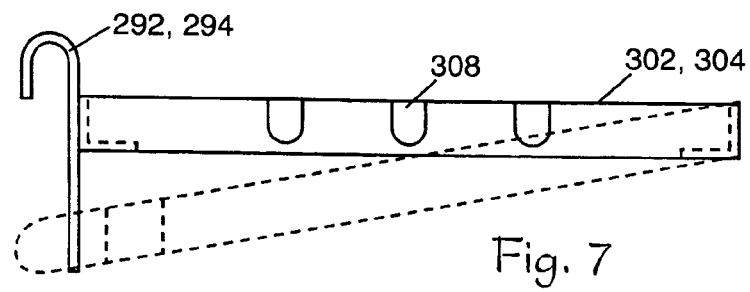
Fig. 7

VERSATILE CARRIER

CROSS REFERENCE TO RELATED APPLICATION

This application is a continuation of application Ser. No. 10/957,890, filed Oct. 4, 2004, now U.S. Pat. No. 7,104,555, issued Sep. 12, 2006.

BACKGROUND OF THE INVENTION

1. Field of the Invention

The present invention relates to the general art of carts and carriers, and to the particular field of hand carts.

2. Discussion of the Related Art

Many work tasks require mobility. That is, a worker must move from place to place to perform a task or multiple tasks. This often requires the worker to transport tools, equipment and/or supplies with him as he moves about. The art contains many examples of tool carriers. However, these tool carriers have several drawbacks.

For example, some tool carriers have limited space. Bulky items, or a great many items cannot be accommodated. A worker may be required to make several trips to complete a single bask. This can be wasteful of time and can be annoying to the worker.

Therefore, there is a need for a carrier that can be adapted to carry a large number of items.

However, in addition to carrying a large number of items, a carrier should be adaptable to accommodate a wide variety of items. That is, the same carrier should be usable with small items as well as large items, and items of varying functions, such as wire spools or the like. The inventor is not aware of any single cart that is adaptable for use with such a wide variety of items.

Therefore, there is a need for a carrier that can be adapted to carry a large variety of items.

Still further, if a carrier is supporting a large number of items or bulky items, that carrier should be stable. Thus, once the carrier is set in a location, it should not be susceptible to tipping or moving. While some carriers in the art are stable after they are loaded, the inventor is not aware of any carrier that is both stable and amenable to transporting a wide variety of items and/or a large number of items.

Therefore, there is a need for a carrier that can be adapted to carry a large number and a large variety of items in a stable manner.

Some carriers in the art are so bulky that they cannot be easily used and moved by a small person. Therefore, such known carriers do not have a wide range of uses since there is a limit to the number of people that are large or strong enough to manipulate or control these known carriers.

Therefore, there is a need for a carrier that can be adapted to carry a large number and a large variety of items in a stable manner yet is easily moved and manipulated.

Still further, some operations, such as a welding operation, or a medical operation, may require a wide variety of tools and equipment and may require several trips to assemble all of the required tools and equipment at one location. The equipment may need to be stored in a readily accessible location yet be located out of the way when necessary. Presently-available carriers are not able to carry and/or store a large variety of tools and/or equipment yet be out of the way when necessary.

Therefore, there is a need for a carrier that is amenable to storing a large variety of tools and/or equipment yet is out of the way when necessary.

PRINCIPAL OBJECTS OF THE INVENTION

It is a main object of the present invention to provide a carrier that can be adapted to carry a large number of items.

It is another object of the present invention to provide a carrier that can be adapted to carry a large variety of items.

It is another object of the present invention to provide a carrier that can be adapted to carry a large number and a large variety of items in a stable manner.

It is another object of the present invention to provide a carrier that can be adapted to carry a large number and a large variety of items in a stable manner yet is easily moved and manipulated.

It is another object of the present invention to provide a carrier that is amenable to storing a large variety of tools and/or equipment yet is out of the way when necessary.

SUMMARY OF THE INVENTION

These, and other, objects are achieved by a carrier that includes a plurality of changeable shelves as well as a section that can carry large and/or bulky items. The carrier also includes an easily applied brake unit as well as an easily deployed stabilizer unit.

Using the carrier embodying the present invention will permit a user to carry and/or store a large number and a large variety of items, from small items and single tools, to large and bulky items, such as large boxes and the like. The carrier is easily and quickly adapted to such variety and will be quite stable when in use or when standing. The carrier is easy to set up and to move and thus can be used by nearly anyone whereby the carrier of the present invention has a wide range of uses and can be located out of the way when necessary.

BRIEF DESCRIPTION OF THE DRAWING FIGURES

FIG. 2 is a side elevational view of the carrier embodying the present invention in a set up condition.

FIG. 3 is a side elevational view of the carrier embodying the present invention in a set up condition with a bulky item being supported thereon and as seen from a side opposite the side seen in FIG. 1.

FIGS. 4A-4C are top plan views of various shelves that can be used in the carrier embodying the present invention.

FIG. 5 is a side elevational view of a shelf.

FIG. 6 is a side elevational view of a basket that can be used in the carrier of the present invention.

FIG. 7 is a wire reel holder attachment for the carrier of the present invention.

FIGS. 8A-8D side, back, and end elevational views of brake unit and mounting bracket for load-engaging clamp of the present invention.

Figure 8A:
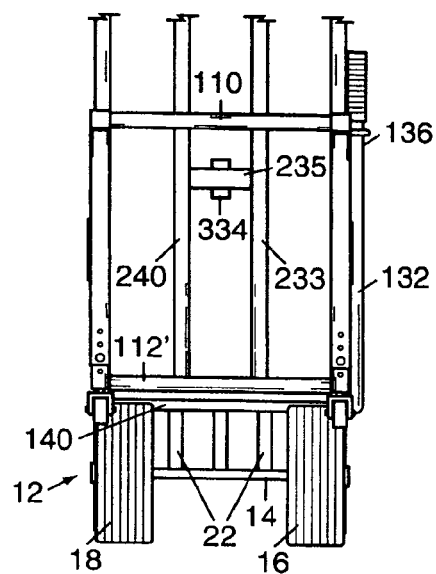
Figure 8B:
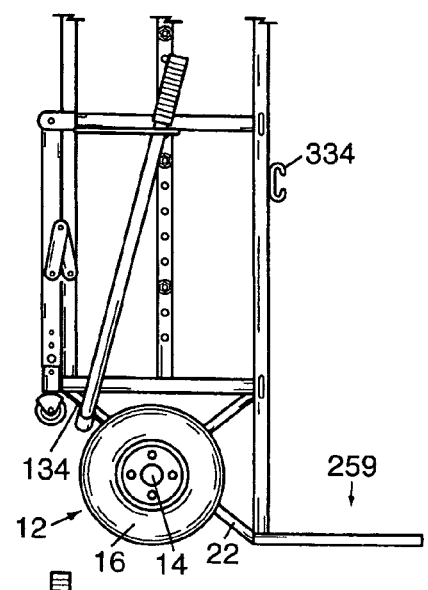
Figure 8C:
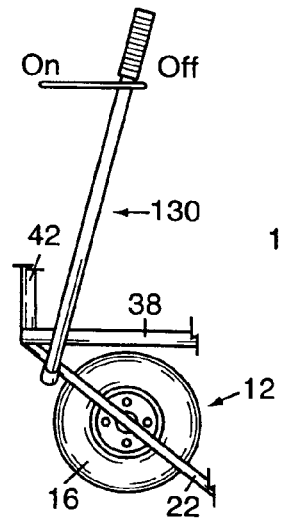
Figure 8D:
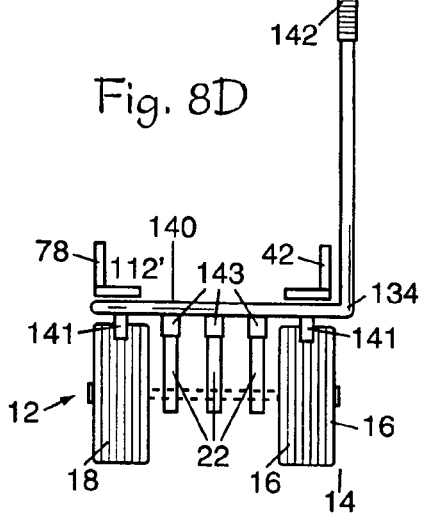
Figure 8F:
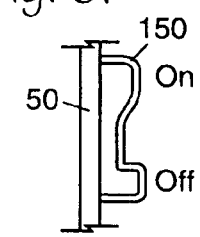
Figure 8E:
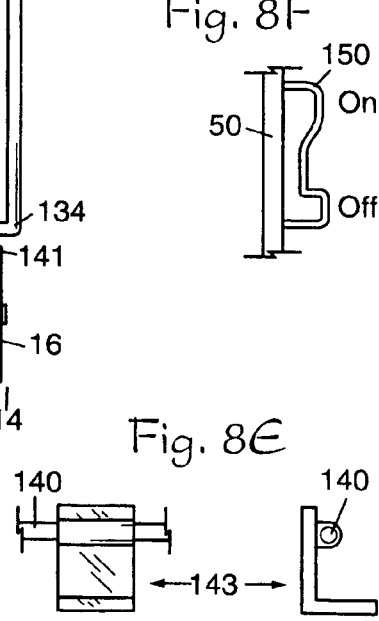

FIGS. 8E-8F are schematic representations of an angle bracket and a handle cage, respectively.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a carrier 10 which is adaptable for carrying a wide variety of items.

Carrier 10 comprises a wheel unit 12 which includes an axle 14 and two wheels 16 and 18 rotatably mounted thereon. A base unit 20 has a plurality of support bars, such as support bar 22, mounted on axle 14.

Figure 1:
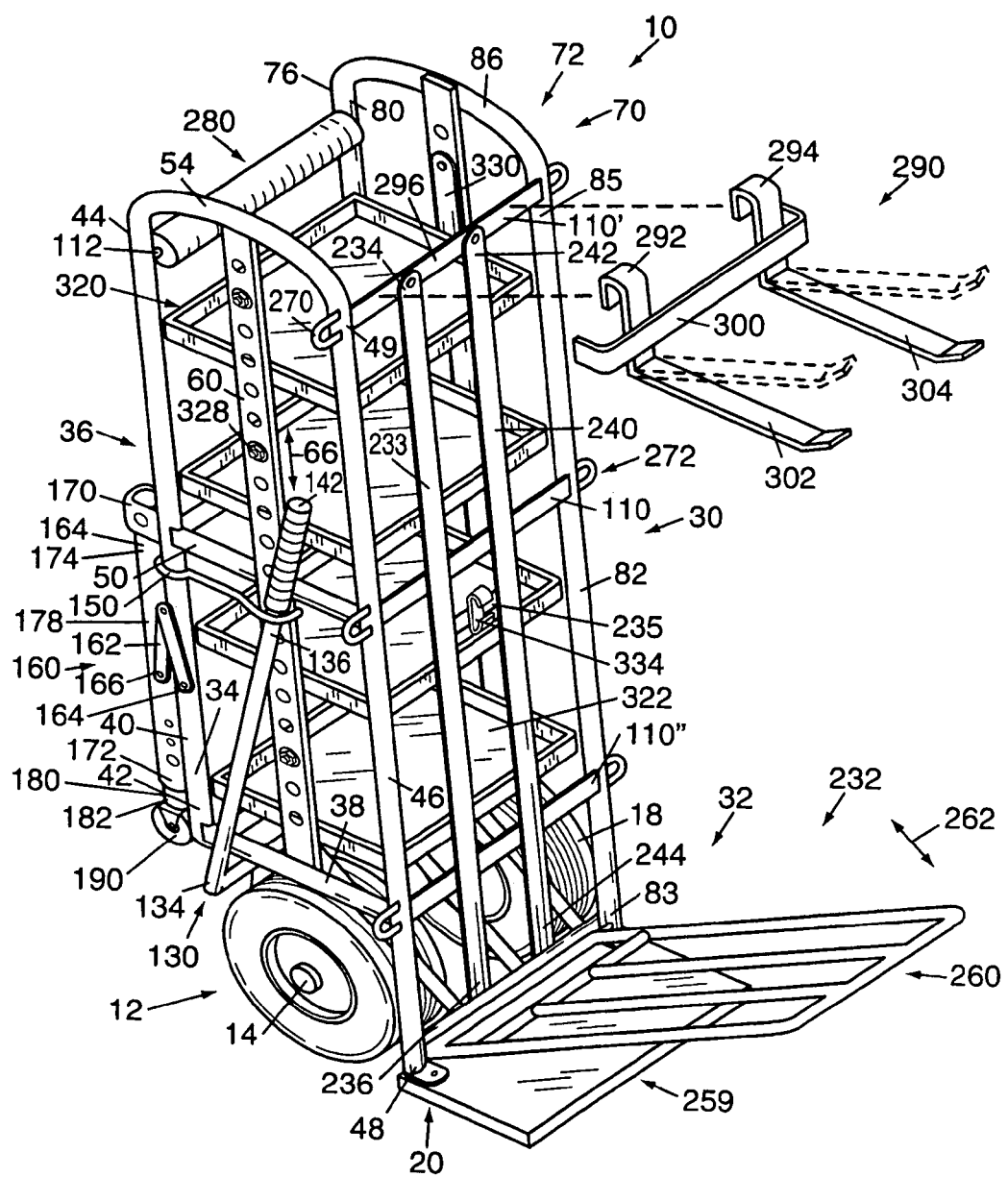
FIG. 1 is a perspective view of a carrier embodying the present invention as seen from one side of the carrier.

A frame unit 30 includes a base portion 32, that is supported on axle 14, and a first side portion 34, which has a one-piece frame unit 36. One-piece frame unit 36 includes a first bar 38, that is a bottom bar when frame unit 30 is in use as indicated in FIG. 1, and a second bar 40, that is a first vertical side bar when frame unit 30 is in use. First vertical side bar 40 has a first end 42, that is a bottom end when the frame unit is in use, and a second end 44, that is a top end when the frame unit 30 is in use.

A third bar 46 is a second vertical side bar when frame unit 30 is in use and has a first end 48, that is a bottom end when frame unit 30 is in use, and a second end 49, that is a top end when the frame unit 30 is in use. Bottom bar 38 extends between bottom end 42 of first vertical side bar 40 and second vertical side bar 46 and is fixed to second vertical side bar 46 near bottom end 48 of second vertical side bar 46.

A fourth bar 50 extends between the first and second vertical side bars 40, 46.

A curved fifth bar 54 is a top bar when frame unit 30 is in use. Curved fifth bar 54 extends between the top ends 44, 49 of the first and second vertical side bars 40, 46 and is one-piece with the top ends 44, 49 of the first and second vertical side bars 40, 46.

A shelf support bar 60 has a first end 62, that is a top end when frame unit 30 is in use, and a second end 64, that is a bottom end when the frame unit 30 is in use. Shelf support bar 60 has a longitudinal axis 66 that extends between first end 62 and second end 64. A plurality of fastener-accommodating holes, such as hole 68, are defined through shelf support bar 60. The fastener-accommodating holes 68 of shelf support bar 60 are spaced apart from each other in the direction of longitudinal axis 66. First end 62 is affixed to curved fifth bar 54 and second end 64 of shelf support bar 60 is fixed to bottom bar 38.

A second side portion 70 has a one-piece frame unit 72 includes a first bar 74 that is a bottom bar when frame unit 30 is in use. A second bar 76 is a third vertical side bar when frame unit 30 is in use. Third vertical side bar 76 has a first end 78, that is a bottom end when frame unit 30 is in use, and a second end 80, that is a top end when frame unit 30 is in use.

A third bar 82 is a fourth vertical side bar when frame unit 30 is in use. Bottom bar 74 extends between bottom end 78 of third vertical side bar 76 and fourth vertical side bar 82. Fourth vertical side bar 82 includes a first end 83, that is a bottom end when frame unit 30 is in use, and a second end 85 that is a top end when frame unit 30 is in place.

A fourth bar 84 extends between the third and fourth vertical side bars 76, 82 and is fixed to fourth vertical side bar 82.

A curved fifth bar 86 is a top bar when frame unit 30 is in use. Curved fifth bar 86 extends between the top ends 80, 85 of the third and fourth vertical bars 76, 82 and is one-piece with the top ends 80, 85 of the third and fourth vertical bars 76, 82.

A shelf support bar 90 has a first end 92, that is a top end when frame unit 30 is in use, and a second end 94, that is a bottom end when frame unit 30 is in use. Shelf support bar 90 has a longitudinal axis 96 that extends between first end 92 of shelf support bar 90 and second end 94 of shelf support bar 90. A plurality of fastener-accommodating holes, such as hole 100, are defined through shelf support bar 90. The fastener-accommodating holes 100 of shelf support bar 90 are spaced apart from each other in the direction of longitudinal axis 96 of shelf support bar 90. First end 92 of shelf support bar 90 is affixed to curved fifth bar 86 and second end 94 of shelf support bar 90 is fixed to bottom bar 74.

A plurality of first crossbrace elements 110 are connected to the second and fourth vertical side bars 46, 82 and second crossbrace elements 112 are connected to the first and third vertical side bars 40, 76 near the curved top bars 54, 86 of the first and second side portions 34, 70. A bottom crossbrace 112 is connected to bottom ends 42 and 78 near first bars 38 and 74 as shown in FIG. 8A.

A brake unit 130 includes a handle 132 which has a first end 134 located adjacent to one wheel of wheel unit 12 and which is pivotally mounted on bottom bars 22 and a second end 136 which is located near fourth bar 50.

A wheel-engaging element 140 is located on the handle 132 near the one wheel of the wheel unit 12, which engage wheels 16 and 18 at 141 as shown in FIG. 8D when the brake unit 130 is applied, and a hand grip element 142 is located on second end 136 of the handle 132.

A handle cage 150 is mounted on fourth bar 50 and is located to engage the second end 136 of the handle 132.

Handle 132 is movable between a first position shown in FIG. 1 and FIGS. 8B-8C with the wheel-engaging element 140 spaced apart from wheels 16 and 18 of the wheel unit 12 and a second position with the wheel-engaging element 140 in abutting contact with wheels 16, 18 of the wheel unit 12.

Angle brackets 143, attached to outside support bars 22, provide support for support element 140 as shown in FIG. 8D.

A support unit 160 includes a first lever arm 162 having a first end 164 pivotally connected to first vertical side bar 40 and a second end 166.

A first support leg bracket 170 is fixed to the first vertical side bar 40 near fourth bar 50 and a first telescoping leg 172 has a proximal end 174 pivotally attached to first support leg bracket 170 and a distal end 176. First telescoping leg 172 includes a first section 178 attached to first support leg bracket 170 and a second section 180 telescopingly accommodated in the first section 178 of the first telescoping leg 172. Second section 180 has a distal end 182. First telescoping leg 172 moves between a first position adjacent to the first vertical side bar 40 as shown in FIG. 1 and a second position with distal end 182 spaced apart from the first vertical side bar 40. Second end 166 of first lever arm 162 is pivotally attached to first section 178 of first telescoping leg 172.

A plurality of first locking pin-accommodating holes are defined through the first section 178 of the first telescoping leg 172 and a plurality of second locking pin-accommodating holes are defined through the second section 180 of the first telescoping leg 172.

A locking pin is accommodated in the first and second locking pin-accommodating holes in the first telescoping leg 172.

A ground-engaging element 190 is located on distal end 182 of second section 180 of first telescoping leg 172.

A second lever arm 200 has a first end 202 pivotally connected to third vertical side bar 76 and a second end 204.

A second support leg bracket 208 is fixed to third vertical side bar 76 near fourth bar 84.

A second telescoping leg 210 has a proximal end 212 pivotally attached to second support leg bracket 208 and a distal end 214. Second telescoping leg 210 includes a first section 215 attached to second support leg bracket 208 and a second section 216 telescopingly accommodated in first section 215 of the second telescoping leg 210. Second section 216 has a distal end 220. Second telescoping leg 210 moves between a first position adjacent to the third vertical side bar 76 and a second position, shown in FIG. 3, with distal end 220 spaced apart from third vertical side bar 76. Second end 204 of second lever arm 200 is pivotally attached to first section 215 of second telescoping leg 210.

A plurality of first locking pin-accommodating holes, such as hole 224, are identical to the locking pin-accommodating holes in the first telescoping leg 172 and are defined through first section 215 of second telescoping leg 210.

A plurality of second locking pin-accommodating holes, such as hole 226, are identical to the locking pin-accommodating holes in the first telescoping leg 172 and are defined through second section 216 of second telescoping leg 210.

A locking pin is identical to the locking pin in the first telescoping leg 172 and is accommodated in the first and second locking pin-accommodating holes 224, 226 in second telescoping leg 210.

A ground-engaging element 230 is located on distal end 220 of the second section 216 of the second telescoping leg 210.

Carrier 10 further comprises an outer load bearing unit 232 as shown in FIGS. 1 and 2.

A first load support bar 233 having a first end 234, that is a top end when frame unit 30 is in a use orientation, and a second end 236, that is a bottom end when frame unit 30 is in a use orientation. Top end 234 is fixed to first crossbrace element 110' of the plurality of first crossbrace elements 110 and second end 236 is fixed to a second crossbrace element 110".

A second load support bar 240 has a first end 242, that is a top end when frame unit 30 is in a use orientation, and a second end 244 that is a bottom end when frame unit 30 is in a use orientation. Top end 242 of second load support bar 240 is fixed to first crossbrace element 110' and second end 244 of the second load support bar 240 is fixed to second crossbrace element 110" of the plurality of first crossbrace elements.

Outer load bearing unit 232 further includes a platform base 259 that is fixed to bottom end 78 of third vertical side bar 76 and to bottom end 83 of fourth vertical side bar 82 and to the bottom ends 236, 244 of the first and second load support bars, 233 and 240 respectively.

A bracket support bar 235, fixed between first and second load support bars 233 and 240, provide support for clamp 334 as shown in FIG. 8A.

An extension element 260 is pivotally fixed to the bottom ends 48, 83 of the second and fourth vertical side bars 46, 82 adjacent to the platform base 259 and moves between a position adjacent to the vertical support bars and a position extending at a right angle to the support bars as indicated by double-headed arrow 262 in FIG. 1. The extension element 260 is shown in FIG. 1 extending at an oblique angle with respect to the vertical side bars.

A plurality of tie-down eyelets, such as tie-down eyelet 270, are located on the second vertical side bar 46, and a plurality of tie-down eyelets, such as tie-down eyelet 272, are located on the fourth vertical side bar 82.

A frame handle 280 is located on crossbrace element 112 near the top ends 44, 80 of first and third vertical side bars 40 and 76 respectively.

An outrigger unit 290 is used in conjunction with frame unit 30 to support special items such as wire coils or the like. Outrigger unit 290 includes first and second crossbrace-engaging hooks 292 and 294, which are sized to releasably engage one of the plurality of the second crossbrace elements of frame unit 30. Outrigger unit 290 is shown in association with top crossbrace element 296, but could be used in association with any of the second crossbrace elements.

Outrigger unit 290 further includes a connecting bar 300, fixed to first and second crossbrace-engaging hooks 292 and 294, and first and second load-supporting bars 302 and 304, which are fixed to the crossbrace-engaging hooks 292, 294.

As can be understood from FIG. 7, each of the supporting bars 302, 304 can include a plurality of notches, such as notch 308, for supporting axles of wire rolls or the like and can be fixed to the crossbrace-engaging hooks 292, 294 to extend at an oblique angle with respect to the crossbrace-engaging hooks 292, 294.

Carrier 10 further includes a plurality of support shelves, such as support shelf 320 as shown in FIGS. 1-3, 4A and 5 for example. Each shelf 320 includes a planar section 322, a first support arm 326 pivotally connected to shelf support bar 60 of the first side portion 34 by a fastener 328 which extends through a faster-accommodating hole 68, and a second support arm 330 pivotally connected to shelf support bar 90 of the second side portion 70 by a fastener 332 extending through a fastener-accommodating hole 100. A load-engaging clamp 334 is mounted on 235 of the support bars 233 and 240 and can be used to hold extension element 260 in place when the extension element 260 is in a stored orientation and not deployed.

The shelves 320 are pendently mounted on the support bars 60, 90 to swing between a vertical orientation, as shown in FIG. 1, and an angular orientation, as shown in FIGS. 2 and 3, wherein items stored on the shelves 320 will remain in a vertical orientation when the carrier 10 is tipped as is customary to insert an item on the platform base 259 or on the extension element 260 of the carrier 10. When the carrier 10 is tipped into the angular position for moving from location to location, the shelves 320 will remain in a vertical orientation, thus preventing the items thereon from falling off. Items on the shelves 320 can be tied in place if desired.

As can be understood from FIGS. 4B and 4C, the support shelves 320 can include a plurality of holes, such as small circular holes 350, or large circular holes 352, or polygonal holes 354, defined through the planar section 322 thereof. Tools, or toolcarriers, such as toolchests T, or workpieces, or the like, can be supported on the shelves 320 with items such as screwdrivers, wrenches or hammers accommodated in the small circular holes 350 and items such as nursery planting pots or cups, or the like, accommodated in the large circular holes 352. As can be understood from FIG. 6, the support shelves 320 can also be in the form of a basket 370 if desired to hold other items. The shelves 320 can be mixed whereby some of the shelves 320 include small circular holes 350, some of the shelves 320 include large circular holes 352, some of the shelves 320 include polygonal holes 354, and some of the shelves 320 are baskets 370, the clearance between adjacent shelves 320 can also be adjusted as will occur to those skilled in the art based on the teaching of this disclosure. Such variations are also intended to be included in the scope of this disclosure as well.

A strap or straps 380 can also be used to tie large or bulky cargo to the frame unit 30 using eyelets 270, 272 if desired. Further straps, such as strap T', can also be used to tie items to the support shelves 320.

It is to be understood that while certain forms of the present invention have been illustrated and described herein, it is not to be limited to the specific forms or arrangements of parts described and shown.

What is claimed is:

1. A carrier comprising:
   (a) a wheel unit including an axle and two wheels rotatably mounted on the axle;
   (b) a base unit having at least one support bar mounted on the axle of the wheel unit;
   (c) a frame unit including:
      (1) a base portion supported on the axle,
      (2) a first side portion having a shelf support bar,
      (3) a second side portion having a shelf support bar, and
      (4) a plurality of crossbrace elements fixedly connecting the first side portion to the second side portion, and
   (d) a brake unit including a wheel-engaging element, a handle pivotally mounted to the frame unit with the handle being movable between a first position wherein the wheel-engaging element is spaced apart from the wheels of the wheel unit and a second position wherein the wheel-engaging element in spaced in abutting contact with the wheels of the wheel unit, and a handle cage for retaining the handle in the first or second position;
   (e) a support unit including:
      (1) a first lever arm and a first adjustable telescoping leg pivotally attached to each other and to the first side portion, and
      (2) a second lever arm and a second adjustable telescoping leg pivotally attached to each other and to the second side portion;
   (f) an outer load bearing unit including:
      (1) at least one vertically oriented load support bar having a bottom end and being fixed to the frame unit,
      (2) a platform base fixed to the bottom end of the at least one load support bar,
      (3) an extension element pivotally attached to the frame unit wherein the extension element is movable between a first position with the extension element extending at a right angle with respect to the frame unit and a second position with the extension element extending nearly parallel with respect to the frame unit, and
      (4) a plurality of tie-down eyelets fixed to the frame unit;
   (g) a frame handle fixed to the frame unit;
   (h) an outrigger unit including:
      (1) first and second crossbrace-engaging hooks sized to releasably engage one of the plurality of the crossbrace elements of the frame unit,
      (2) a connecting bar fixed to the first and second crossbrace-engaging hooks, and
      (3) first and second load-supporting bars fixed to the crossbrace-engaging hooks; and
   (i) a plurality of support shelves, each shelf being pendently supported between the shelf support bars of the first and second side portions.

* * * * *